(12) United States Patent
Galembeck

(10) Patent No.: US 11,673,103 B2
(45) Date of Patent: Jun. 13, 2023

(54) METHOD FOR PRODUCING STABLE GRAPHENE, GRAPHITE AND AMORPHOUS CARBON AQUEOUS DISPERSIONS

(71) Applicants: Elisa Ferreira, Campinas (BR); Fernando Galembeck, Campinas (BR)

(72) Inventor: Fernando Galembeck, Campinas (BR)

(73) Assignees: Elisa Ferreira, Campinas (BR); Fernando Galembeck, Campinas (BR)

( * ) Notice: Subject to any disclaimer, the term of this patent is extended or adjusted under 35 U.S.C. 154(b) by 0 days.

(21) Appl. No.: 17/060,804

(22) Filed: Oct. 1, 2020

(65) Prior Publication Data

US 2021/0069660 A1    Mar. 11, 2021

Related U.S. Application Data

(62) Division of application No. 15/768,706, filed as application No. PCT/BR2016/050169 on Jul. 22, 2016, now abandoned.

(30) Foreign Application Priority Data

Oct. 16, 2015 (BR) .......................... 102015026420-8

(51) Int. Cl.
| | | |
|---|---|---|
| B01F 23/50 | (2022.01) | |
| C08K 3/04 | (2006.01) | |
| C09D 7/45 | (2018.01) | |
| C09D 5/24 | (2006.01) | |
| C09D 5/32 | (2006.01) | |
| C09D 11/037 | (2014.01) | |
| C09D 11/14 | (2006.01) | |
| C09D 11/17 | (2014.01) | |
| C09D 11/52 | (2014.01) | |
| C09D 101/02 | (2006.01) | |
| C09J 9/02 | (2006.01) | |
| C09J 101/02 | (2006.01) | |
| H01B 1/04 | (2006.01) | |
| B82Y 40/00 | (2011.01) | |
| B01F 101/35 | (2022.01) | |
| B01F 101/36 | (2022.01) | |
| H01B 13/00 | (2006.01) | |
| H01M 4/587 | (2010.01) | |
| G02B 5/00 | (2006.01) | |
| H01M 4/62 | (2006.01) | |

(52) U.S. Cl.
CPC .............. *B01F 23/511* (2022.01); *C08K 3/04* (2013.01); *C08K 3/042* (2017.05); *C09D 5/24* (2013.01); *C09D 5/32* (2013.01); *C09D 7/45* (2018.01); *C09D 11/037* (2013.01); *C09D 11/14* (2013.01); *C09D 11/17* (2013.01); *C09D 11/52* (2013.01); *C09D 101/02* (2013.01); *C09J 9/02* (2013.01); *C09J 101/02* (2013.01); *H01B 1/04* (2013.01); *H01B 13/0036* (2013.01); *B01F 2101/35* (2022.01); *B01F 2101/36* (2022.01); *B82Y 40/00* (2013.01); *G02B 5/003* (2013.01); *H01M 4/587* (2013.01); *H01M 4/625* (2013.01)

(58) Field of Classification Search
CPC .......... B01F 23/511; C08K 3/04; H01B 1/04; C09D 5/24; C09D 5/32; C09D 7/45; C09D 11/037; C09D 11/14; C09D 11/17; C09D 11/52; C09D 101/02
USPC .............. 252/500, 502, 506; 423/445 R, 460
See application file for complete search history.

(56) References Cited

U.S. PATENT DOCUMENTS

| | | | | |
|---|---|---|---|---|
| 2015/0072162 A1* | 3/2015 | Hersam | .................. | C09D 11/14 428/473.5 |
| 2016/0276056 A1* | 9/2016 | Stolyarov | ................ | H01B 1/04 |

FOREIGN PATENT DOCUMENTS

CN          101899233 A    * 12/2010    .............. B01F 17/48

OTHER PUBLICATIONS

Liu "Direct exfoliation of graphene in organic solvents with addition of NaOH." Chem. Commun., 2011, 47, 6888-6890 (Year: 2011).*
Carrasco "High-concentration aqueous dispersions of graphene produced by exfoliation of graphite using cellulose nanocrystals." C A R B N 7 0 (2014) 157-163 (Year: 2014).*
Terzopoulou et al. "Recent Advances in Nanocomposite Materials of Graphene Derivatives with Polysaccharides." Materials 2015, 8, 652-683 (Year: 2015).*

* cited by examiner

*Primary Examiner* — Tri V Nguyen
(74) *Attorney, Agent, or Firm* — B. Aaron Schulman, Esq.; Stites & Harbison, PLLC

(57) ABSTRACT

The present disclosure relates to a process to produce aqueous dispersions of graphene stabilized by cellulose, offering an alternative to the current methods of dispersion of graphene. The present process provides the advantages that it uses biodegradable cellulose compatible with the environment and can be used in industrial processes in alkaline medium or in the absence of alkali; and when graphene is stabilized with cellulose in alkaline medium it becomes unstable when in contact with natural waters, thus precipitating and being easily removed or concentrated. In other embodiments, solids obtained by drying of the dispersions, once dried, can be redispersed in aqueous alkaline solution.

3 Claims, 2 Drawing Sheets

METHOD FOR PRODUCING STABLE GRAPHENE, GRAPHITE AND AMORPHOUS CARBON AQUEOUS DISPERSIONS

CROSS-REFERENCE TO RELATED APPLICATIONS

This application is a divisional application of U.S. Ser. No. 15/768,706, having a filing date of Apr. 16, 2018, which was a 371 application of International application PCT/BR2016/050169, filed Jul. 22, 2016, which claimed the benefit of Brazilian application BR102015026420-8, filed Oct. 16, 2015, all of said applications incorporated herein by reference.

FIELD OF THE INVENTION

The present invention relates a production process of aqueous dispersions of graphene, graphite, nanographite and amorphous carbon, based on the unexpected and unprecedented property of cellulose acting as dispersant of hydrophobic particles in aqueous medium, as agent of exfoliation of graphite particles and amorphous carbon, spontaneously. This process avoids the use of surfactants in the production of graphene and the step of transformation of graphite in graphene oxide which is usually necessary to achieve its dispersions in aqueous media.

In this invention, "cellulose" is a polymer registered under CAS Number 9004-34-6. The term "cellulose" used here comprises different crystalline forms of this polymer, including micro and nanocrystalline celluloses, and arrangements of macro, micro or nanofibres of different sizes and aspect ratios.

In this invention, "graphite" comprises and represents the mineral graphite, with a structure composed of aromatic rings of carbon and registered under CAS Number 7782-42-5.

In this invention, "amorphous carbon" comprises and represents any substances or materials consisting mainly of carbon with the predominance of conjugated aromatic rings, in particular the compounds registered under CAS Number 7440-44-0. It includes amorphous carbon obtained by pyrolysis of wood or other materials of vegetable origin with activation by oxygen and/or acid or alkali compounds, as well as mineral coals and turfs.

BACKGROUND OF INVENTION

To understand the character of novelty of this invention is necessary to know in detail graphene, graphite and amorphous carbon, their properties, the need of their dispersions to be used in different applications and also the procedures currently used to disperse graphene and graphite in water.

Graphite is a material with very unique properties: it is formed solely of carbon atoms bonded together, forming conjugated aromatic rings arranged in lamellas that reach macroscopic dimensions, being one of the most known allotropic forms of carbon. It is very nonpolar, hydrophobic and good conductor of electricity and heat. Its acoustic and thermal properties are highly anisotropic, since the phonons propagate rapidly along a plane or lamella, in which atoms are covalently bonded, but not between the planes. It has high thermal stability and only oxidizes fast in air at high temperatures, above 700° C. It is diamagnetic, floating in the air on a magnet. Its properties ensures a large number of applications like lubricants, pigments, electrodes, coatings of molds and brakes, batteries, refractories, anti-flame agents and pressure sensors in microphones and others equipments. It also has undesirable properties, such as to facilitate corrosion of aluminum and some steels. Moreover, its mechanical properties are very anisotropic, preventing its use as a building or structural materials.

Graphene is another allotropic form of carbon, having the structural basic unit of graphite, carbon, carbon nanotubes and fullerenes. It is formed of one or a few lamellas of atomic thickness, each formed by hundreds or thousands of conjugated aromatic rings. For this reason, individual graphene lamellae can be understood as a molecule of a polycyclic aromatic hydrocarbon with extremely large number of rings. Its mechanical properties are remarkable, because the graphene sheets are 207 times stronger than steel per unit mass. It conducts electricity and has important electronic effects: bipolar transistor, ballistic transport of charge and large quantum oscillations.

Amorphous carbons are a large group of substances derived from graphite, but with many chemical and structural defects which produce interesting properties. The property that gives the highest number applications is the high adsorption capacity, responsible for the extensive use of so-called activated carbon in the treatment of water, water effluents and gases. Other important properties are the mechanical reinforcement and absorption of ultra-violet light, which make the colloidal carbons or carbon blacks required components of many plastics and rubber articles, particularly tires used in automotive vehicles.

A large part of the applications of graphite, graphene, amorphous carbon and derived substances, such as carbon nanotubes and fullerenes, requires that they are obtained in dispersions, aqueous or not, or dispersed and mixed with other solids.

For this reason, a great effort of research and development has been devoted to obtain dispersions and nanodispersions of graphite, graphene, and amorphous carbon, mainly in aqueous media. An evidence of the importance of this issue is the repercussion of an article describing the obtainment of graphene in aqueous medium, published by an Australian group (Li, D., Muller, M. B.; Gilje, S. Kaner, R. B. and Wallace, G. G.), entitled "Processable aqueous dispersions of graphene nanosheets" and published in Nature Nanotechnology, volume 3, pages 101-105, in 2008. This article has been cited more than 4500 times in the scientific literature, a number that exceeds the total number of citations obtained by many productive scientists throughout their life. This work has inspired many patents, for example, the patent application USPTO 20130197158, deposited on Jan. 8, 2013, which claims a process of production of nanocomposites of graphene with polyurethanes.

On the other hand, the diversity of applications and the need for concentrated dispersions of graphene led to the use of exotic dispersants, as the article of Ayan-Varela et al, published in ACS Applied Materials Interfaces, volume 7, pages 10293-10307, in 2015, in which the authors describe the obtainment of concentrated dispersions (5%) of graphene using as dispersant one flavonucleotide, which is a complex and expensive substance.

Sang-Soo Lee, Kyunghee Kim, Soon Ho Lim, Min Park, Jun Kyung Kim, Heesuk Kim, Hyunjung Lee; in the U.S. Pat. No. 8,178,201, May 15, 2012, teach two methods for obtain graphene from graphite: mechanical delamination made by sticking an adhesive tape on graphite and physicochemical delamination, described by Sang-Soo and collaborators as: "Such common method for preparing graphene from graphite is roughly separated into two types of mechanical and physicochemical delaminations. The mechanical delamination repeats the process of attaching and detaching an adhesive tape on graphite lump to peel graphene off there from. The physicochemical delamination comprises the steps of dispersing graphite having laminated structure in an appropriate solvent; subjecting the graphite in solvent to oxidation reaction to extend the space between the laminates of the graphite, and, thus to obtain the graphene oxide; and subjecting the graphene oxide to reduction reaction to obtain graphene."

The present invention describes a surprising fact, which is the efficient action of microcrystalline cellulose as exfoliating agent, dispersing and stabilizing of graphite, graphene and substances related to these, such as amorphous carbon. This result is unexpected because the cellulose is not recognized as surfactant or used as dispersant of powder particles in aqueous media and is itself well-known for its insolubility in any common liquids. On the other hand, dispersants are amphiphilic substance and cellulose is not recognized as amphiphilic by most researchers, engineers and technicians, although this characteristic of cellulose is supported by some research groups in the world. The results of this present invention are even more surprising because it does not depend on of the oxidation steps of carbon compounds, forming graphene lamellas, which in the current state of the art are necessarily followed by a step of reduction and stabilization with surfactants. The formation of the graphene oxide and its reduction forming graphene again are steps that introduce chemical and structural imperfections in the resultant products, which damage their use properties.

SUMMARY OF THE INVENTION

The present invention relates to a novel process to produce aqueous dispersions of graphene stabilized by cellulose, offering a new alternative to the current methods of dispersion of graphene. The process which is the object of this invention has the following advantages: a) it uses cellulose as dispersant that is biodegradable, renewable, recyclable, nontoxic and compatible with the environment and it is often used in industrial process in alkaline medium and even in the absence of alkali; b) the graphene stabilized with cellulose in alkaline medium becomes unstable when in contact with natural waters, precipitating and therefore being easily removed or concentrated; c) in some implementations of this invention, the graphene dispersed in cellulose in alkaline medium has high adhesion to various solid substrates, especially cellulosic materials such as textile fibers and papers, what is desirable in applications in printed electronic circuits, in other words, electronic/photonic devices mounted on paper or fabrics; d) this process does not requires any chemical modification or oxidation of graphite or graphene, which is part of the state of art but presents the disadvantage of destroy partially the graphene structure, damaging its conductive and optical properties; e) in some implementations of this invention, the solids obtained by drying of the dispersions, once dried, can be redispersed in aqueous alkaline solution; f) even when alkaline dispersions are used, the films obtained by drying are dispersions only mildly alkaline or neutral, because the alkali used in the forming of the dispersion is neutralized by atmospheric $CO_2$.

The invention also contemplates the products obtained with these dispersions, such as: conductive inks, conductive adhesives or other products obtained with dispersions of graphene and nanographite stabilized by cellulose

DETAILED DESCRIPTION OF FIGURES

Figure 1:
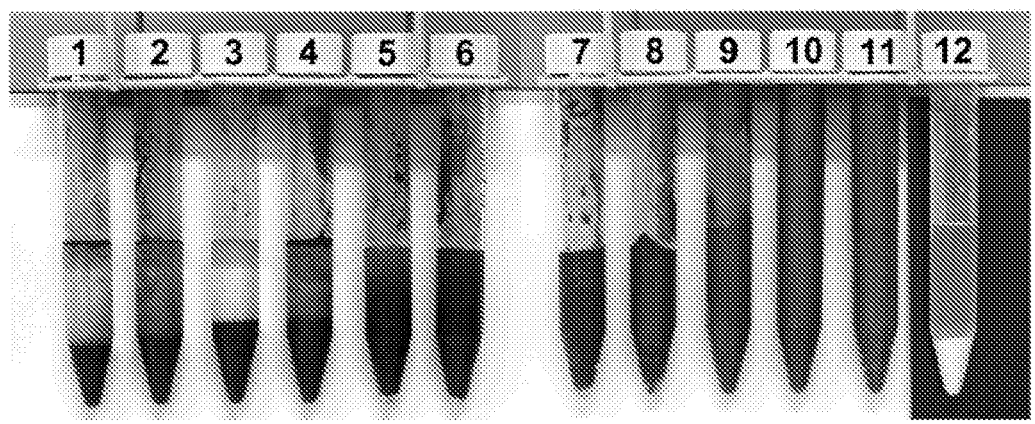
FIG. 1 is a photographic image that shows aqueous dispersions containing different concentrations of graphite, cellulose and NaOH, after 24 hours of decantation. The concentrations (w/w) of each dispersion are: 1) 1% NaOH, 2% cellulose and 2% graphite; 2) 1% NaOH, 2% cellulose and 5% graphite; 3) 1% NaOH, 5% cellulose and 2% graphite; 4) 1% NaOH, 5% cellulose, 5% graphite; 5) 7% NaOH, 2% cellulose and 2% graphite; 6) 7% NaOH, 2% cellulose and 5% graphite; 7) 7% NaOH, 5% cellulose and 2% graphite; 8) 7% NaOH, 5% cellulose, 5% graphite; 9) 0% NaOH, 5% cellulose, 5% graphite; 10) 0% NaOH, 0% cellulose and 5% graphite; 11) 7% NaOH, 0% cellulose and 5% graphite; 12) 0% NaOH, 0% cellulose and 5% graphite.

FIG. 1 is a photographic image that shows aqueous dispersions containing different concentrations of graphite, cellulose and NaOH, after 24 hours of decantation. The concentrations (w/w) of each dispersion are: 1) 1% NaOH, 2% cellulose and 2% graphite; 2) 1% NaOH, 2% cellulose and 5% graphite; 3) 1% NaOH, 5% cellulose and 2% graphite; 4) 1% NaOH, 5% cellulose, 5% graphite; 5) 7% NaOH, 2% cellulose and 2% graphite; 6) 7% NaOH, 2% cellulose and 5% graphite; 7) 7% NaOH, 5% cellulose and 2% graphite; 8) 7% NaOH, 5% cellulose, 5% graphite; 9) 0% NaOH, 5% cellulose, 5% graphite; 10) 0% NaOH, 0% cellulose and 5% graphite; 11) 7% NaOH, 0% cellulose and 5% graphite; 12) 0% NaOH, 0% cellulose and 5% graphite.

For the preparation of mixtures 1 to 8 solutions and alkaline dispersions of cellulose were initially prepared. First, the sodium hydroxide was solubilized in water and the solution was cooled to 0° C., using an ice bath. The cellulose was added to the NaOH solution and the mixture was homogenized in a disperser at 6500 rpm for 5 min at 0° C. The mixture was kept at −20° C. in a freezer for 2 h. After the preparation of cellulose solutions and dispersions, the samples 1 to 8 received additions of graphite resulting in the concentrations listed above. The mixtures 9 to 12 were prepared by additions of the components in the water. All mixtures were made in plastic centrifuge tubes with lid and the mixtures were shaken on a reciprocal motion shaker at 360 oscillations per minute with a displacement of 2 cm, during 15 h. The mixtures have remained static for 24 h at room temperature (24° C.) and were photographed after the period of decantation.

The mixtures 9 and 10 show that graphite is not dispersed in water without the presence of cellulose, and most of the material remained in contact with the hydrophobic wall of the vial.

In contrast, the system 3 shows total sedimentation of the solids, forming a clear supernatant. The absence of graphite on the wall of the plastic bottle shows that the graphite becomes hydrophilic due to contact with the cellulose. In addition, macroscopic separation of the constituents, cellulose and graphite, in the sediments has not occurred despite the difference of density between them, showing their chemical compatibility.

Mixtures 7 and 8 show dispersions which remained stable after 24 hours, wherein the solids remain in suspension, without the formation of macroscopic domains of each species. These systems show that the cellulose is a dispersant of graphite in water.

Figure 2A:
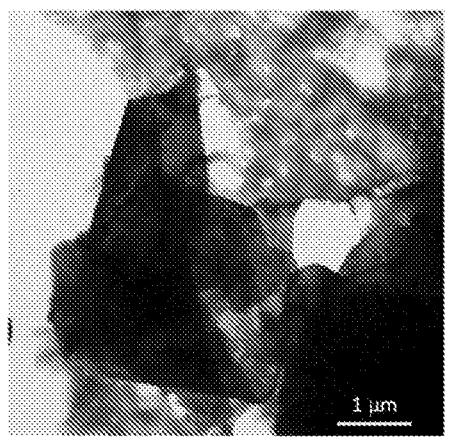
FIGS. 2A and 2B show images of transmission electron microscopy of a dispersion containing 7% NaOH, 5% cellulose and 5% graphite. The images were obtained from the same experiment, where the FIG. 2B was acquired using a 25 eV energy filter for better distinction of the areas of cellulose and graphite.
Figure 2B:
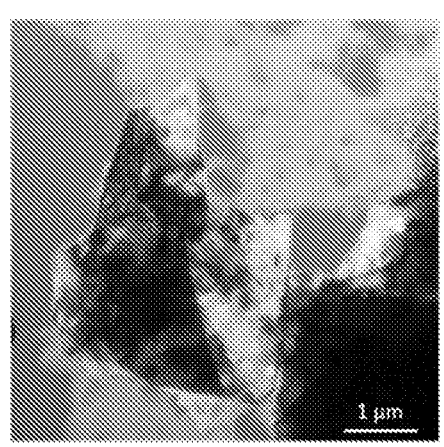

FIGS. 2A and 2B show images of transmission electron microscopy of a dispersion containing 7% NaOH, 5% cellulose and 5% graphite. For the sample preparation, the dispersion of cellulose and graphite was diluted with water and applied immediately on the specimen holder. The images were obtained at 80 kV and in the same region, and the FIG. 2B was obtained using a 25 eV energy filter for better distinction of the areas of cellulose and graphite. In the images it was possible to check the contact, at the microscopic level, of cellulose films with the graphite sheets. The chemical compatibility between the two species is visible and no segregation of the components was observed.

Figure 3:
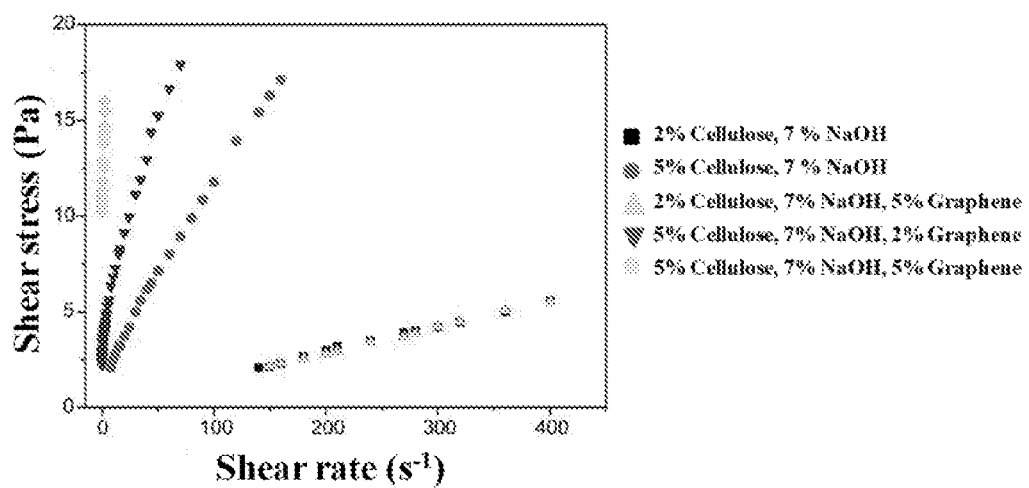
FIG. 3 shows shear stress versus shear rate curves of different mixtures containing cellulose, sodium hydroxide and graphite. The shear stress of the cellulose solution in a concentration of 2% by weight varies linearly with the shear rate, even in the presence of graphite. However, the addition of graphite in an alkaline solution with 5% cellulose causes a sharp increase in viscosity, which is an evidence of graphite exfoliating in lamellar structures containing few sheets.

FIG. 3 shows data about the rheological behavior of different mixtures of cellulose, sodium hydroxide and graphite. The graph in this figure shows that the shear stress varies linearly with shear rate in the cellulose solutions with a concentration of 2%, with or without graphite. However, the viscosity of the solution with 5% cellulose decreases with the shear rate, which is a characteristic property of non-Newtonian fluids. Therefore the concentration of 5% by weight of cellulose is equal or greater than its critical concentration. The addition of graphite in an alkaline solution containing 5% cellulose causes a sharp increase of viscosity, represented by the increase of the slope of the shear stress versus shear rate curves. The viscosity increase due to the addition of particles is an evidence of the exfoliation of the graphite in lamellar structures containing a few sheets, as nanographite or graphene. This type of dispersion has reduced its viscosity with increasing shear rate due to the alignment of the nanographite and graphene lamellas in the flow direction, facilitating the movement of the fluid. For shear rates employed in this rheological analysis, dispersions containing 2% graphite show very high viscosity, reaching 40,000 cP, and dispersions containing 5% graphite present aspect of slurries, with viscosity up to 176000 cP.

Figure 4:
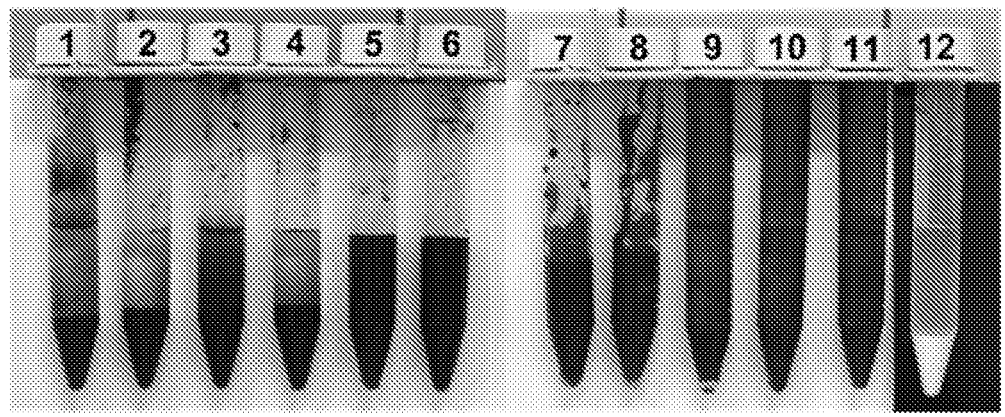
FIG. 4 is a photographic image of aqueous dispersions containing different concentrations of amorphous carbon, cellulose and NaOH, after 24 hours of decantation. The concentrations by weight of each dispersion are: 1) 1% NaOH, 2% cellulose and 2% coal; 2) 1% NaOH, 2% cellulose and 5% carbon; 3) 1% NaOH, 5% cellulose and 2% coal; 4) 1% NaOH, 5% cellulose and 5% carbon; 5) 7% NaOH, 2% cellulose and 2% coal; 6) 7% NaOH, 2% cellulose and 5% carbon: 7) 7% NaOH, 5% cellulose and 2% coal; 8) 7% NaOH, 5% cellulose and 5% carbon; 9) 0% NaOH, 5% cellulose and 5% coal; 10) 0% NaOH, 0% cellulose and 5% carbon; 11) 7% NaOH, 0% cellulose and 5% coal; 12) 0% NaOH, 0% cellulose and 5% coal.

FIG. 4 is a photographic image of 12 aqueous dispersions containing different concentrations of commercial activated carbon, cellulose and NaOH, after 24 hours of decantation. The concentrations by weight of each dispersion are: 1) 1% NaOH, 2% cellulose and 2% activated carbon; 2) 1% NaOH, 2% cellulose and 5% activated carbon; 3) 1% NaOH, 5% cellulose and 2% activated carbon; 4) 1% NaOH, 5% cellulose and 5% activated carbon; 5) 7% NaOH, 2% cellulose and 2% activated carbon; 6) 7% NaOH, 2% cellulose and 5% activated carbon; 7) 7% NaOH, 5% cellulose and 2% activated carbon: 8) 7% NaOH 5% cellulose and 2% activated carbon: 9) 0% NaOH, 5% cellulose and 5% activated carbon; 10) 0% NaOH, 0% cellulose and 5% activated carbon; 11) 7% NaOH, 0% cellulose and 5% activated carbon; 12) 0% NaOH, 0% cellulose and 5% activated carbon.

For the preparation of mixtures 1 to 8 solutions and alkaline dispersions of cellulose were initially prepared. First, the sodium hydroxide was solubilized in water and the solution was cooled to 0° C. using an ice bath. The cellulose was added to the NaOH solution and the mixture was homogenized in a disperser at 6500 rpm for 5 min and at 0° C. The mixture was kept at −20° C. in a freezer for 2 h. After preparation of the solutions and cellulose dispersions, the mixtures 1 to 8 received additions of commercial activated carbon resulting in the concentrations listed above. The mixtures 9 to 12 were prepared by adding the components to water. All mixtures were made in plastic centrifuge tubes and shaken in a reciprocal motion shaker at 360 oscillations per minute with a displacement of 2 cm for 15 h. The mixtures remained static for 24 h at room temperature (24° C.) and were photographed after the decantation period.

The systems 9 and 10 show that carbon does not disperse in water without the presence of cellulose, and much of the material remained in contact with the hydrophobic wall of the vial, so it did not get hydrophilic character, which should have been provided by adsorption of the cellulose.

In contrast, systems 1 to 4 show sedimentation of the carbon in the presence of cellulose, with no carbon spread on the surface of the plastic bottle, such as the systems 9 and 10. The systems 1 to 4 show the accumulation of the aggregate material only in a few regions of the vial, indicating that most of the carbon became hydrophilic due to contact with the cellulose. Furthermore, no macroscopic separation of the constituents, cellulose and carbon, in the sediments was observed despite the density difference of these compounds, showing the chemical compatibility between them.

The mixtures 5 to 8 present dispersions which remain stable after 24 hours, the solids remain in suspension, without the formation of macroscopic domains of each species. These systems show that cellulose disperses carbon in water.

Figure 5:
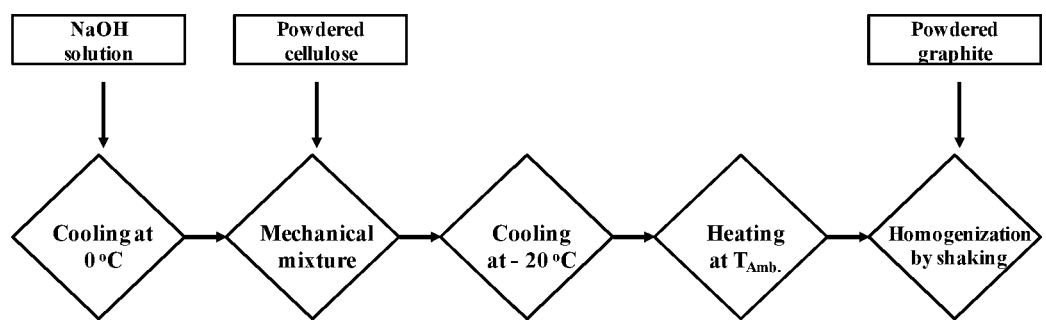
FIG. 5 is a descriptive flowchart of the method shown in Example 1.

FIG. 5 shows the flowchart of the process used in Example 1. The first step is the preparation of an alkaline solution by addition of sodium hydroxide in water, followed by cooling of this solution on an ice bath. Then, microcrystalline cotton cellulose was added to the NaOH and the mixture homogenized in a disperser at 6500 rpm for 5 min at 0° C. The system was maintained at −20° C. for 2 h, obtaining a solution containing 5% (w/w) of cellulose and 7% (w/w) of NaOH. The alkaline cellulose solution was warmed until the room temperature (24° C.) and commercial graphite powder was added at a concentration of 2% (w/w). After the addition, the mixture was stirred in a homogenizer with a reciprocal movement of 360 oscillations per minute and a displacement of 2 cm for 15 hours.

DESCRIPTION OF THE INVENTION

Graphite is a material used in various applications as a lubricant, pigment and conductor of electricity and heat. It is highly hydrophobic, what makes its use in aqueous media difficult, in which it can be dispersed using dispersing agents well-known in the area, such as surfactants and water soluble polymers. The importance of graphite increased very recently when it was discovered the possibility of its exfoliation producing graphene lamellas, of monoatomic thickness. Graphene is, in the present, the most investigated material by material researchers and also of several technology areas that can be benefited by its exceptional chemical, mechanical, electrical and optical properties. Amorphous carbons are materials very common in nature, easily obtained by incomplete combustion and pyrolisis processes. They have great structural affinity with graphite and graphene but they are chemically more complex, due to the oxidation degree, highly variable. Its structure is much less regular than that of graphene and graphite, although polynuclear aromatic domains are prevalent.

Many applications of graphene, graphite and amorphous carbon require its prior dispersion in water. For example, inks and conductive adhesives formulated in aqueous medium require these compounds finely dispersed and stable in the medium. The amorphous carbons, specifically, are widely used as adsorbents of contaminants soluble in water destinated for municipal supply, and in this function it would be very desirable to be able to disperse in water the powdered carbon, what is hampered by its hydrophobicity, as in the case of graphene and graphite.

Given the importance of these materials and especially their aqueous dispersions, many researchers have made considerable efforts to obtain such dispersions. A proof of this is that the United States Patent Trade Office (USPTO) registers 700 patents, searched combining the keywords "graphene" and "cellulose". But when are searched "(graphene or graphite) and cellulose" was founded 18.495 patents. Moreover, the number of patent applications filed since 2001 was 2.072 only searched combining keywords "graphene" and "cellulose". These patents cover a large number of specific applications in the areas of energy (solar cells, lithium batteries and others), lighting (LEDs), information technology (printed and flexible electronic circuits), sensors, diagnostics and analysis devices, electrodes for industrial processes, structural materials for engineering and construction, among others.

The scientific publications also provide abundant evidence of the great interest by these materials. For example, an article that describes the dispersion of graphene in water (Li, D., Muller, M. B., Gilje, S., Kaner, & R. B. Wallace G. G.; Processable aqueous dispersions of graphene nanosheets. Nature NanoTechnology, v. 3(2), p. 101-102, 2008) with more than 4.500 citations.

The methods used in the art to obtain aqueous dispersions of graphene, graphite and amorphous carbons are based on the use of surfactants and water-soluble polymers as dispersants. Very popular methods such as the described by Wallace, G. G. et al. (cited in [0037]) use a previous step of oxidation of graphene forming graphene oxide which is easily dispersed in water. Unfortunately, the oxidation affects many of the desirable properties of graphene, which can be partially recovered by the reduction of the oxide in the presence of stabilizers to prevent their reaggregation and precipitation from the dispersion.

The almost absolute prevalence of methods for graphene dispersion based on the formation and subsequent reduction of graphene oxide becomes apparent when it was found few patents and publications by eliminating of the words "graphene oxide" in the search. A search by eliminating of these words showed only six articles and a patent. The articles are: High Concentration and Stable Aqueous Dispersion of Graphene Stabilized by the New Amphiphilic Copolymer; Wu, Shengli; Shi Tiejun; Zhang, Liyuan. Fullerenes Nanotubes and Carbon Nanostructures, v. 23, p. 974-984, 2015; Liposome-induced exfoliation of graphite to few-layer graphene dispersion with antibacterial activity; Zappacosta, R.; Di Giulio, M.; Ettorre, V.; et al.; Journal of Materials Chemistry B, v. 3, p. 6520-6527, 2015; Aqueous graphene dispersions—optical properties and stimuli-responsive phase transfer Ager, David; Vasantha, Vivek Arjunan; Crombez, Rene; et al., ACS NANO, v. 8, p. 11191-11205, 2014.; Interfacial engineering of polypropylene/graphene nanocomposites: Improvement of graphene dispersion by using tryptophan as a stabilizer"; You, Feng; Wang, Dongrui; Li Xinxin; et al., RSC Advances, v. 4, p. 8799-8807, 2014.; Preparation of PVP-PVA-exfoliated graphite composite cross-linked hydrogels for the incorporation of small tin nanoparticles; Delbecq, Frederic; Kono, Fumihiko; Kawai, Takeshi; European Polymer Journal, v. 49, p. 2654-2659, 2013; Role of poly (N-vinyl-2-pyrrolidone) stabilizer for the dispersion of graphene via hydrophobic interaction; Yoon, Seyoung; Journal of Materials Science, v. 46, p. 1316-1321; 2011.

The patent mentioned in [0039] above is: Lead-acid cell cathode lead-paste, comprehend lead powder, fiber, graphene liquid aqueous dispersion, acetylene black, barium sulfate, sulfuric acid and water, CN103367753, inventors Chen, T.; Gao, X; Huang, H: et al., Shandong University. However, in this patent the graphene is chemically modified, which is one of the ways to make it hydrophilic.

Delbecq, Frederic; Kono, Fumihiko; Kawai, Takeshi; Preparation of PVP-PVA-exfolied graphite cross-linked composite hydrogels for the incorporation of small tin nanoparticles. European Polymer Journal, v. 49, p. 2654-2659, 2013; used only polyvinylpyrrolidone and polyvinylalcohol as exfoliating of the graphite in aqueous medium, but with low efficiency and very dilute solutions.

An unprecedented possibility of dispersion and stabilization of graphite, graphene and amorphous carbons in aqueous solution is the use of cellulose. This polymer, although abundant and well known in the art, presents some challenges to current knowledge, such as the problem of insolubility in practically all known liquids. Attempts to address this problem produced in the last 150 years, several products of technological importance such as rayon, cellophane, "artificial silk", and more recently, regenerated cellulose fibers obtained from cellulose solutions in N-oxide of N-methylmorpholine.

A recent possibility of solubilizing cellulose is the use of aqueous solutions of NaOH at low temperatures or in the presence of urea, thiourea and some other hydrotropic additives. This possibility is interpreted as evidence of the amphiphilic character of cellulose, hypothesis defended by the Swedish researcher Lindman, Bjorn (Alves, L.; Medronho, B.; Antunes, F. E.; Topgaard, D. and Lindman, Bjorn. Dissolution state of cellulose in aqueous systems. 1 Alkaline solvents, Cellulose, v. 23, p. 247-258, 2016) but that is not completely accepted. According to this hypothesis, the cellulose chains have hydrophilic and hydrophobic domains geometrically separated and the association between the hydrophobic domains excludes the water contact with a significant part of the chains area, causing its insolubility in water.

This invention exploits the possibility of connect hydrophobic domains of cellulose chains with faces of graphene lamellas and surfaces of particles of graphite or amorphous carbon, leaving the hydrophilic cellulose domains in contact with the water, which should cause its stabilization.

Researches familiar with the art, should not expect success this way for the stabilization of graphene dispersions, graphite and amorphous carbon, for several reasons: cellulose and graphite are known to be incompatible, even the cellulose is insoluble in water and its amphiphilic nature is not recognized by most practitioners of the art.

However, the experiments described in the examples provided in this patent show that the cellulose is, surprisingly, a dispersing and stabilizing of graphene, graphite and amorphous carbon. The cellulose can be put in contact with the carbon allotropes in different ways: as alkaline aqueous solution of cellulose such as cellulose powder mixed with graphite or amorphous carbon in dry conditions and as cellulose powder mixed with graphite or carbon under water or another liquid compatible with cellulose, graphite or carbon. In all cases, there is an association between cellulose and carbonaceous compound, characterized by the impossibility of observing, by microscopic examination, separation of cellulose particles from the others, due to dispersion and stability in water of the carbonaceous compound and its rheological behavior.

When graphite is dispersed with cellulose it is possible to exfoliate graphite forming graphene, depending on the relative amounts, the intensity of the contact between two reactants, the intensity of mechanical action and the temperature. The graphene formed, when brought into contact with more cellulose, is also stabilized by it, so that the cellulose can be used to produce graphene stabilized, in an aqueous medium.

The dispersions and slurries of carbon materials in this present invention comprise the use of cellulose (CAS Number 9004-34-6) or pulp composed mainly of cellulose (CAS Number 65996-61-4) dispersed partially or totally solubilized. The present invention comprises the use of cellulose as a dispersing agent for materials formed mainly of carbon such as graphite, nanographite, graphene, amorphous carbons, colloidal carbons, fullerenes and carbon nanotubes. The amounts of cellulose necessary are conveniently expressed by the ratio of the masses of cellulose and graphite or other carbonaceous material, and can vary from 1 part of cellulose to 99 of graphite, nanographite, graphene, amorphous carbon, colloidal carbon, fullerenes and carbon nanotubes and 60 cellulose for 40 graphite, nanographite, graphene, amorphous carbon, colloidal carbon, fullerenes and carbon nanotubes.

The concentrations of graphite or other carbonaceous materials in liquid dispersions, slurry or dry mass may vary between 0.001% and 50% by weight of graphite on the weight of the dispersion.

The dispersions and slurries of this invention may be prepared in neutral or alkaline medium. Alkalis are selected from a group comprising sodium, potassium, lithium, calcium and ammonium, tetramethylammonium, or aluminates and zincates of alkali and its concentration may vary between 0% and 50% by weight.

In an alternative embodiment of the invention, the dispersion or slurry can be produced with a neutralizing additive, such as sodium bicarbonate, borax, boric acid or other substance with buffering action at neutral pH. Neutralizing agents will be required to achieve the desired pH, depending on the concentration of alkali used. The additive can be added in solid form, in solution or in any other manner known in the art, in any convenient concentration.

In another embodiment of the invention, the dispersion or solution of cellulose in an alkaline medium is produced by addition of a hydrotrope additive such as urea, thiourea, mono-, di- and triethanolamines, glycerol, ethanol and other alcohols, dimethylsulfoxide, toluene sulfonates, xylene sulfonates, cumen sulfonates, lignin sulphonates, benzoates, salicylates, citrates, acetates and other compounds known in the art. The amounts of additives can vary between 0% and 25% by mass of solution or dispersion of graphite or other carbonaceous compound in the presence cellulose.

In another embodiment of the invention, the alkaline cellulose solution or dispersion is added with oxides of zinc, aluminum, vanadium, titanium or germanium.

In another embodiment, the aqueous medium may be replaced partially or completely by a polar organic liquid, such as methanol, ethanol, iso-propanol, n-propanol, acetone, ethylene glycol, glycerol, mono-methyl ethylene glycol, containing or not an alkali, with concentration ranging between 0 and 50%.

The following examples represent only some embodiments of the present invention and should not be considered, in any way, as limiting of the scope and inventive concept of the present invention, since there are additional possible alternatives and arrangements.

EXAMPLES

Example 1—Preparation of Aqueous Dispersion Containing 2% of Graphite, 5% of Cellulose and 7% of NaOH An alkaline solution was prepared by adding sodium hydroxide in water and the solution was cooled to 0° C. in an ice bath. Microcrystalline cotton cellulose was added in NaOH solution and the mixture was homogenized in a disperser at 6500 rpm for 5 min and at 0° C. The system was kept at −20° C. for 2 h, obtaining a solution containing 5% (w/w) cellulose and 7% (w/w) NaOH. The alkaline cellulose solution was warmed to room temperature (24° C.) and commercial graphite was added at a concentration of 2% (w/w). After the addition, the mixture was stirred in a disperser with reciprocal movement to 360 oscillations per minute with a displacement of 2 cm for 15 hours.

The dispersion stability was evaluated by keeping the system standing for 24 h. After this period, there was no settling of solids and appearance of the dispersion remained unchanged. Also, it was not observed distinct domains of cellulose and graphite, indicating that there was no separation of the two species, despite the density difference (graphite from 2.09 to 2.23 $g/cm^3$ and cellulose 1.5 $g/cm^3$), showing the compatibility of the compounds.

The dispersion was centrifuged at 3000 rpm for 1 h at 20° C. and it was obtained a sediment volume of 3.5 ml of a total volume of approximately 5 mL. It was not observed heterogeneity in the sediment or its separation in graphite and cellulose.

Example 2—Preparation of Aqueous Dispersion Containing 5% of Graphite, 5% of Cellulose and 7% of NaOH An alkaline solution containing 5% of cellulose was prepared as in example 1. The alkaline cellulose solution was warmed to room temperature (24° C.) and commercial graphite was added at a concentration of 5% (m/m). The mixture was homogenized as in example 1, turning into a slurry.

The dispersion stability was evaluated by keeping the system standing for 24 h. After this period, there was no settling of the solids, as in example 1.

5 ml of the dispersion were centrifuged at 3000 rpm for 1 h at 20° C., and it was obtained 3.6 ml of sediment volume.

Example 3—Preparation of Aqueous Dispersion Containing 2% of Graphite, 5% of Cellulose and 1% of NaOH A dispersion containing 5% (w/w) of cellulose and 1% (w/w) of NaOH was prepared as in examples 1 and 2. The cellulose dispersion was warmed to room temperature (24° C.) and commercial graphite was added at a concentration of 2% (w/w). After the addition, the mixture was stirred as in examples 1 and 2.

The dispersion stability was evaluated by keeping the system standing for 24 h. After this period, the solids were sedimented and a clear supernatant was formed with no deposit of material on the wall of a plastic bottle, as occurred in the graphite dispersion in water. The sedimentation of the particles indicates that graphite and cellulose are in contact and there are no macroscopic domains of both, and furthermore, the solids remain in the aqueous medium, like a water-cellulose system.

5 ml of the dispersion was centrifuged at 3000 rpm for 1 h at 20° C., and a sediment volume of 1.0 ml was obtained.

Example 4—Preparation of Aqueous Dispersion Containing 5% of Activated Carbon, 2% of Cellulose and 7% of NaOH A solution containing 2% (w/w) cellulose and 7% (w/w) NaOH was prepared as in examples 1-3. The cellulose solution was warmed to room temperature (24° C.) and the activated carbon was added at a concentration of 5% (m/m). After the addition, the mixture was stirred as in examples 1-3.

The dispersion stability was evaluated by keeping the system standing for 24 h. After the period, there was no settling of solids, and the system remained unchanged. Also, it was not observed different domains of cellulose and activated carbon, indicating that there was no separation of the two species, despite the density difference (activated carbon 2.0 to 2.1 g/cm$_3$ and cellulose 1.5 g/cm$^3$), showing the compatibility of compounds and, therefore, that the alkaline cellulose is a good dispersing of activated coal in water.

Example 5—Preparation of Aqueous Dispersion Containing 5% of Activated Coal, 5% of Cellulose and 1% of NaOH A dispersion containing 5% (w/w) of cellulose and 1% (w/w) of NaOH was prepared as in examples 1-4. The cellulose dispersion was warmed to room temperature (24° C.) and the activated carbon was added at a concentration of 5% (m/m). After the addition, the mixture was stirred as in examples 1-4.

The dispersion stability was evaluated by keeping the system standing for 24 h. After this period, the solids were sedimented forming a clear supernatant without an uniform distribution of carbon in the wall of the plastic bottle, as observed in the activated carbon dispersion in aqueous NaOH solution. The sedimentation of the particles indicates that the activated carbon and cellulose are in close contact, because it was not observed macroscopic domains of both.

Example 6—Preparation of Aqueous Dispersion Containing 5% of Activated Coal, 5% of Cellulose and 7% of NaOH A solution containing 5% (w/w) of cellulose and 7% (w/w) of NaOH was prepared as in examples 1-5. The cellulose solution was warmed to room temperature (24° C.) and activated carbon was added at a concentration of 5% (m/m). After the addition, the mixture was stirred as in examples 1-5, turning it into a slurry.

The dispersion stability was evaluated by keeping the system standing for 24 h. After the period, there was no settling of solids and the system remained unchanged. Also, it was not observed different domains of cellulose and activated carbon indicating that there was no separation of the two species, despite the density difference (activated coal 2.0 to 2.1 g/cm$^3$ and cellulose 1.5 g/cm$^3$), showing the chemical compatibility of the compounds, where the alkali cellulose is the dispersant of the activated carbon in water.

What is claimed is:

1. A process for dispersing carbonaceous materials selected from the group consisting of graphite, carbon nanotubes, fullerenes, and colloidal carbons comprising forming a dispersion of said carbonaceous materials in an alkaline cellulose solution, said alkaline cellulose solution consisting of a solution or dispersion of cellulose in an alkaline aqueous medium, at a range of concentrations of the cellulose from 0.001% to 50% by weight of the alkaline cellulose solution, and forming dispersions of nanometric particles without the use of surfactants or other dispersants.

2. A process for spontaneous formation of dispersions of carbonaceous materials comprising forming said carbonaceous materials in solutions or dispersions consisting of cellulose in an alkaline aqueous medium, and obtaining spontaneous swelling and dispersion of solid carbonaceous materials by immersing said solid carbonaceous materials in the cellulose-containing alkaline aqueous medium and shaking periodically.

3. The process according to claim 2 wherein the carbonaceous materials are selected from the group consisting of graphite carbon nanotubes, fullerenes, and colloidal carbon.

* * * * *